No. 782,256.

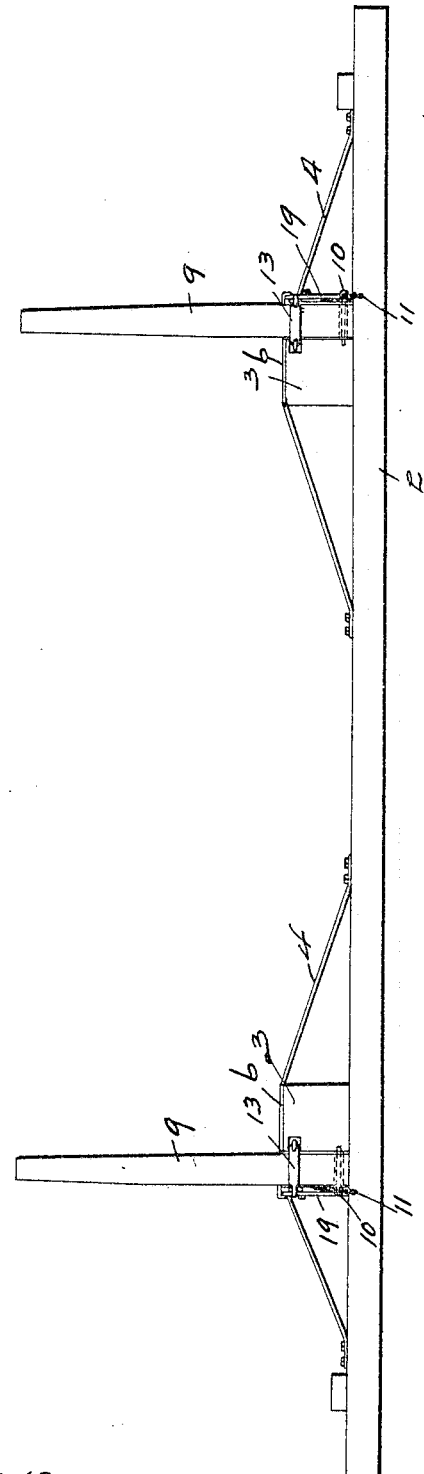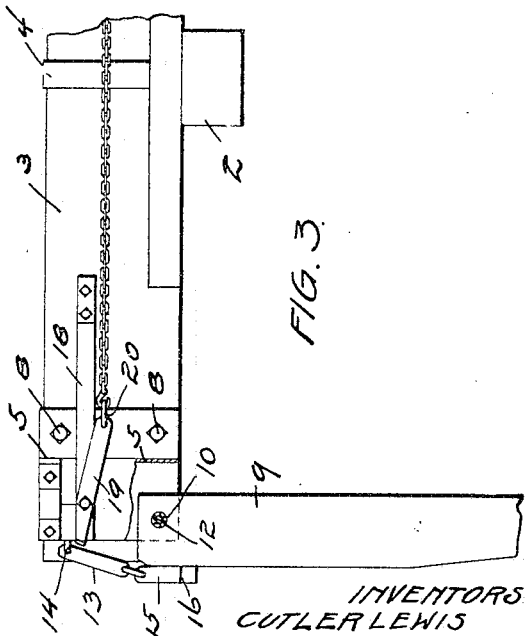

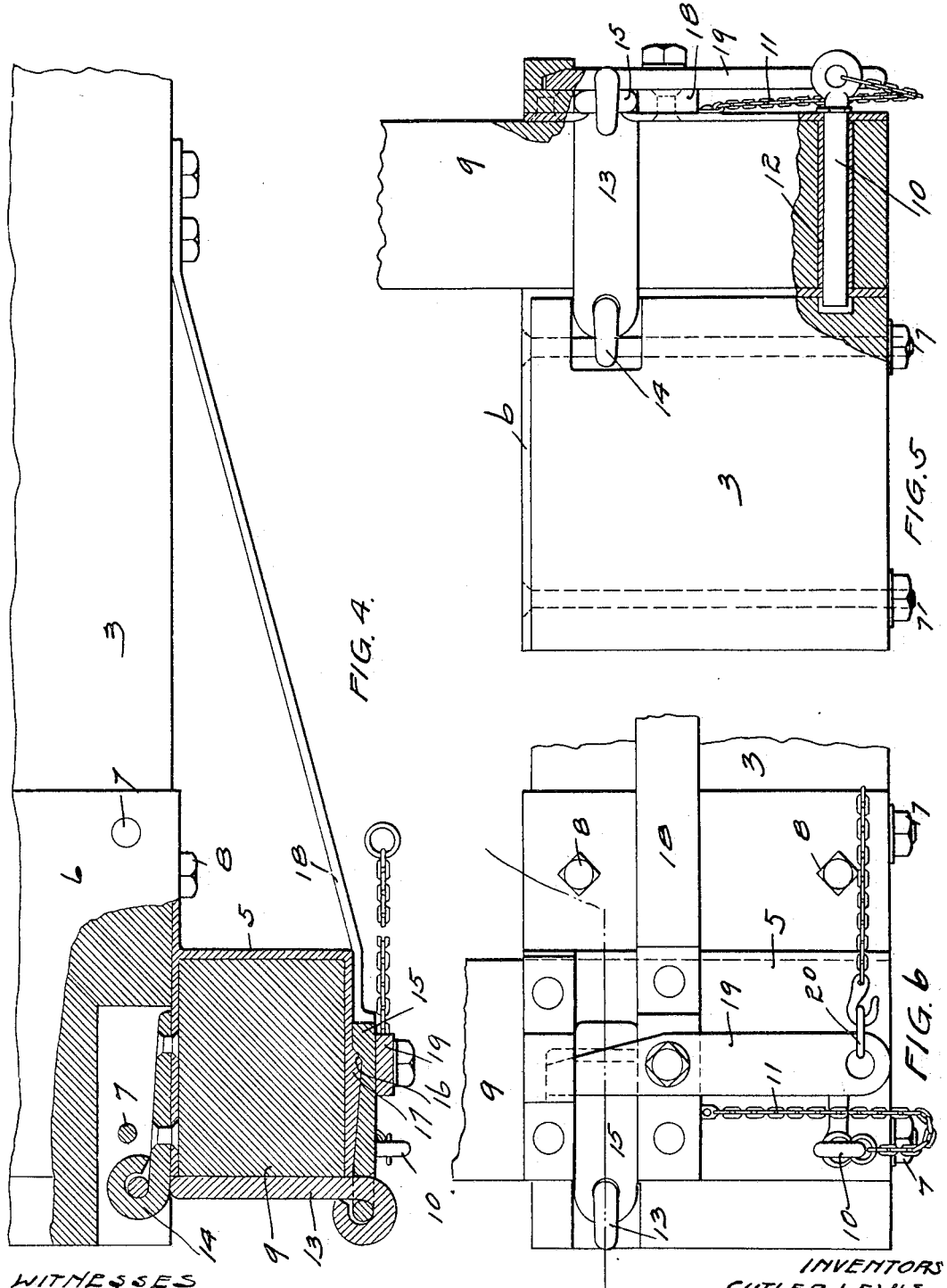

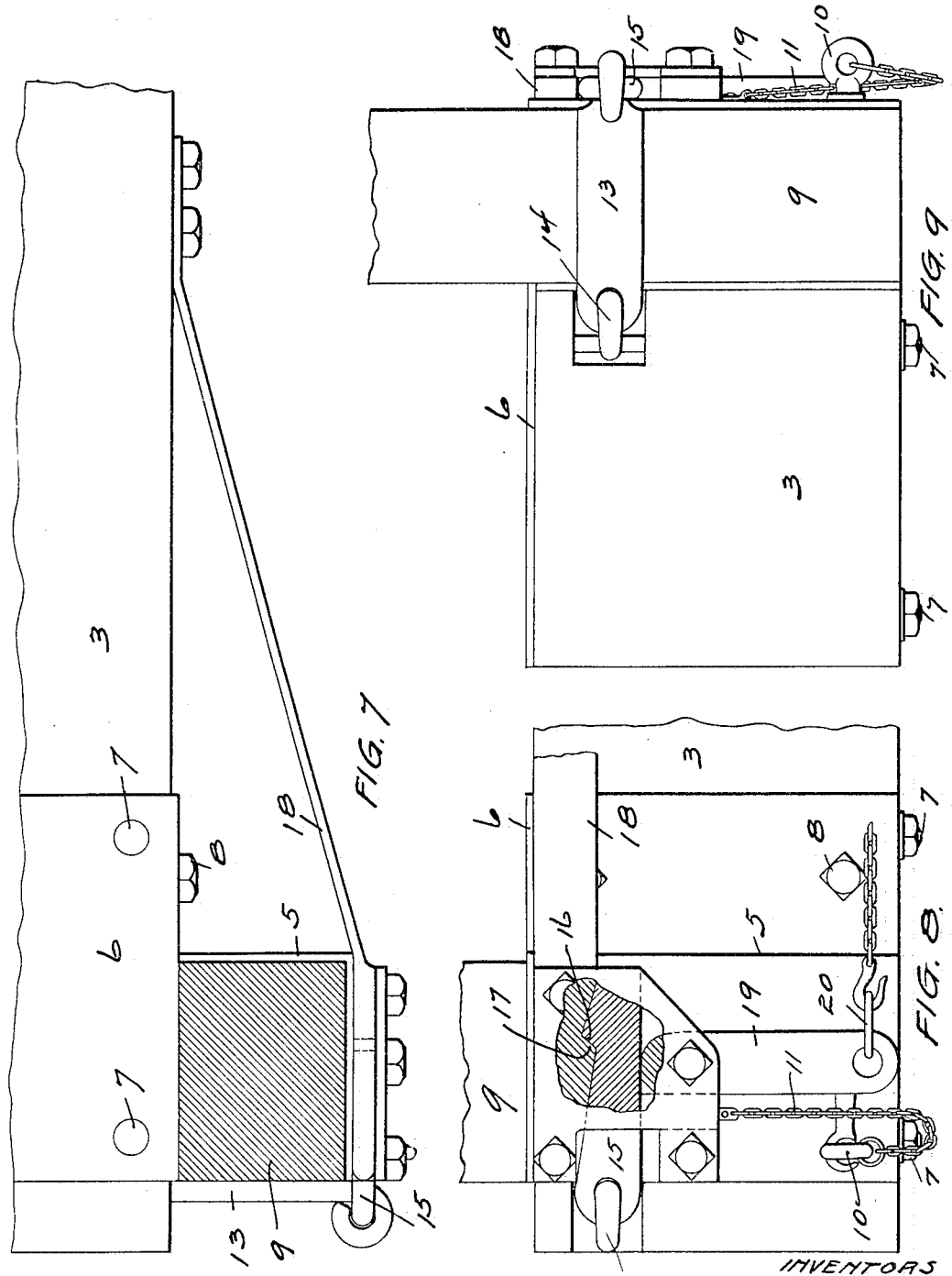

Patented February 14, 1905.

UNITED STATES PATENT OFFICE.

CUTLER LEWIS AND ARTHUR J. BOSTWICK, OF EAU CLAIRE, WISCONSIN.

STAKE-HOLDER.

SPECIFICATION forming part of Letters Patent No. 782,256, dated February 14, 1905.

Application filed May 2, 1904. Serial No. 205,956.

*To all whom it may concern:*

Be it known that we, CUTLER LEWIS and ARTHUR J. BOSTWICK, of Eau Claire, in the county of Eau Claire, State of Wisconsin, have invented certain new and useful Improvements in Stake-Holders, of which the following is a specification.

The object of our invention is to provide a stake-holder which will rigidly support a stake when in use, but permit its ready removal when the load is discharged without danger to the life or limb of the workmen.

A further object is to provide a holder from which a stake can be quickly and easily removed without the necessity of cutting it off above the socket, an operation that is frequently resorted to when the load bears heavily upon the stake.

Other objects of the invention will appear from the following detailed description.

The invention consists generally in a box or socket having an opening in its side wall of sufficient size to allow the discharge of a stake laterally therefrom and means for temporarily locking the stake in said box.

Further, the invention consists in means for pivoting the stake in the box to prevent its complete discharge therefrom.

Further, the invention consists in various constructions and combinations, all as hereinafter described, and particularly pointed out in the claims.

In the accompanying drawings, forming part of this specification, Figure 1 is a side elevation of a portion of a logging-car, showing our invention applied thereto. Fig. 2 is a transverse section showing the manner of mounting the stake-holder on the bunk. Fig. 3 is a detail view showing the stake-holder in its unlocked position. Fig. 4 is a plain view, partially in section, showing the construction of the box. Fig. 5 is a detail side view showing the stake locked in the holder. Fig. 6 is a detail view showing the mechanism for locking the stake in the holder. Figs. 7, 8, and 9 are details of a modified construction.

In the drawings, 2 represents the frame whereon the bunks 3 are transversely arranged and upon which the logs are placed.
These bunks are braced in the usual manner by straps 4 and are similar to those in general use on logging-cars. On each end of the bunks, at one side thereof, we arrange a stake-holder or socket consisting of a box 5, preferably of sheet-metal of suitable gage to withstand the strain of the load and provided with a plate 6, that extends over the top of the bunk and is secured thereto by bolts 7. The plate extends down upon the side of the bunk, and bolts 8 are provided which aid in securing the device rigidly and prevent any possibility of its twisting out of place while in use. The box is substantially rectangular in cross-section and is open on the side toward the end of the bunk and the outside of the car to allow the insertion of the stake 9 therein and permit its convenient discharge when it is desired to remove the load.

A pivot-pin 10 is secured to the box by a light chain 11 and passes through holes in the walls thereof and through the stake 9 within a bushing 12, and this pin forms a pivot on which the stake turns and swings down to a vertical position below the bunk when the load is discharged. It sometimes happens that the logs are unloaded down over the bank of a stream, and unless some means were provided for securing the stakes they might be carried down with the logs into the river and lost. By pivoting them, however, in the manner described all danger of losing the stakes is avoided, and they can readily be swung back into the holder when the load has been discharged from the car.

13 is a strap pivoted to an eye 14 on the wall of the box and adapted to extend across the open side of the box and close the same against accidental discharge of the stake. A latch 15 is pivotally connected to the strap 13 and provided on one side with a recess 16 to receive a boss 17 on the outer wall of the box. A strap 18 is secured to the box-wall at one end and at the other end is bolted to the bunk and holds the outer portion of the box firmly in place. A lever 19 is pivoted at a point intermediate to its ends on said strap and has a beveled upper end adapted to swing past said latch and prevent its accidental disengagement from the boss 17. The greater portion of the lever is below its pivot, and consequently the lever will normally assume a vertical position and lock the latch in engagement with the boss, and as the lever swings freely on its pivot any shaking or jarring of the load will not cause the release of the latch, and it will be impossible for the stake to become separated from the box or holder until the latch is released.

The logs are loaded on the car in the usual manner, and the stakes swung up into the box or holder and secured. Upon reaching the point where it is desired to discharge the load the workmen will attach a chain to a ring 20 in the lower end of the lever 19 and pass the chain through a loop and back to the same side of the load or carry it across the load to the other side and by drawing thereon swing the lever on its pivot until it clears the latch and allows it to drop away from the boss. Thereupon the pressure of the logs will swing the stake out of the box or holder and allow the logs to roll off the load. With this device all danger of injury to the workmen by being caught in the path of the logs as they roll from the load will be entirely avoided, as the operator can stand at a considerable distance from the stake in releasing the locking device, and as the stake swings outwardly and drops into a position entirely out of the path of the logs there will never be any occasion for cutting off a stake above the holder, which frequently happens where holders of the ordinary kind are employed and it is necessary to lift the stake vertically therefrom and when the load is bearing heavily upon the stake.

We do not wish in this application to confine ourselves to the use of the pivot for attaching the stake to the holder, as in some instances we may prefer to allow the stake to drop down upon the ground. This feature of the device, however, we have shown and described in a companion application herewith, filed May 2, 1904, Serial No. 205,957, that covers the form of stake which we prefer to use in connection with a logging-sleigh.

We claim as our invention—

1. A stake-holder having an opening in its side wall of sufficient size to allow the discharge of a stake laterally therethrough, a latch mechanism arranged to extend across the open side of said holder, means engaging said latch mechanism to hold it in place across said open side, and means preventing accidental disengagement of said latch from said holding means.

2. The combination, with a bunk having a stake-holder or box provided with an open side, of a latch device arranged to extend across said open side and lock the stake in said box, said latch device being provided with a recess, a boss fitting said recess, and a gravity-lever arranged to prevent the premature separation of said boss and recess.

3. The combination, with a bunk, of a plate bolted to the top and side thereof, a box provided on said plate and having an open side contiguous to the end of said bunk, a strap connecting the outer side wall of said box with said bunk, and a locking device for temporarily closing the open side of said box against the discharge of a stake therethrough, substantially as described.

4. The combination, with a bunk, of a stake-holder secured thereon and comprising a box having an open side, a stake fitting within said box, a latch mechanism arranged to extend across the open side of said box and lock the stake therein, a lever arranged to swing lengthwise of said bunk and temporarily lock said latch device, and means extending to the other end of said bunk from said holder for operating said lever.

5. The combination, with a bunk, of a stake-holder secured thereon comprising a box having an open side, a strap pivoted on one side of said box, a recessed latch carried by said strap, a boss adapted to enter said recess, and a lever arranged to lock said latch against accidental disengagement from said boss.

6. The combination, with a bunk, of a stake-holder having an open side secured thereon, a latch device arranged to extend across the open side of said holder and having a recess, a boss fitting said recess, a lever engaging said latch device and preventing the premature separation of it and said boss, and an operating-chain connected with said lever and extending to the opposite end of the bunk, for the purpose specified.

7. The combination, with a bunk, of a stake-holder provided thereon and comprising a sheet-metal box having an open side contiguous to the end of the bunk, a stake fitting within said box and inserted and discharged through said open side, a latch device extending across the open side near the top of said box for temporarily locking said stake therein, and a pivot-pin passing through said box and also the outer lower corner of said stake, for the purpose specified.

8. The combination, with a bunk, of a sheet-metal stake-holder having an open side secured to one side of said bunk near one end, a latch device extending across the open side of said holder to temporarily lock the stake therein, locking means for said latch device arranged to move lengthwise of said bunk, and means extending to the other end of said bunk for operating said locking means.

In witness whereof we have hereunto set our hands this 19th day of April, 1904.

CUTLER LEWIS.
ARTHUR J. BOSTWICK.

In presence of—
J. AMUNDSON,
A. C. PAUL.